(12) United States Patent
Varkey et al.

(10) Patent No.: US 12,321,028 B2
(45) Date of Patent: Jun. 3, 2025

(54) ELECTRO-OPTICAL WIRELINE CABLES

(71) Applicant: Schlumberger Technology Corporation, Sugar Land, TX (US)

(72) Inventors: Joseph Varkey, Richmond, TX (US); Maria Grisanti, Missouri City, TX (US); David Kim, Katy, TX (US); Ian Mace, Sugar Land, TX (US); Tam Tran, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 219 days.

(21) Appl. No.: 17/806,278

(22) Filed: Jun. 10, 2022

(65) Prior Publication Data
US 2022/0397731 A1    Dec. 15, 2022

Related U.S. Application Data

(60) Provisional application No. 63/209,031, filed on Jun. 10, 2021.

(51) Int. Cl.
*G02B 6/44* (2006.01)
*H01B 7/02* (2006.01)
(Continued)

(52) U.S. Cl.
CPC ........... *G02B 6/443* (2013.01); *G02B 6/4416* (2013.01); *G02B 6/4432* (2013.01);
(Continued)

(58) Field of Classification Search
CPC .... G02B 6/4416; G02B 6/443; G02B 6/4432; H01B 7/0241; H01B 7/046; H01B 7/1885; H01B 7/1895
See application file for complete search history.

(56) References Cited

U.S. PATENT DOCUMENTS

| 1,948,439 A | 2/1934 | Budscheid |
| 1,973,091 A | 9/1934 | Miller |

(Continued)

FOREIGN PATENT DOCUMENTS

| CN | 2755741 Y | 2/2006 |
| CN | 201327731 Y | 10/2009 |

(Continued)

OTHER PUBLICATIONS

H. Ku, H. Wang, N. Pattarachaiyakoop, M. Trada, "A review on the tensile properties of natural fiber reinforced polymer composites", Composites Part B: Engineering, vol. 42, Issue 4, 2011, pp. 856-873, doi:10.1016/j.compositesb.2011.01.010, 18 pages. (Year: 2011).*

(Continued)

*Primary Examiner* — Daniel Petkovsek
*Assistant Examiner* — Emma R. Oxford
(74) *Attorney, Agent, or Firm* — Jeffrey D. Frantz

(57) ABSTRACT

Cables that include a conductor and an optical fiber. In some embodiments, the cable can include an optical fiber loosely disposed within an enclosure. A conductor layer can be disposed about the enclosure. An insulation layer can be disposed about the at least one conductor layer. An inner layer of armor strength members can be helically disposed about the insulation layer. An outer layer of armor strength members can be helically disposed about the inner layer of armor strength members. The armor strength members in the outer layer of armor strength members can be at an opposite helix compared to the armor strength members in the inner layer of armor strength members. An outer jacket can be disposed about the outer layer. In other embodiments, the cable can include an optical fiber in a coupled electro-optical package, where the conductor layer can be disposed about the electro-optical package.

14 Claims, 7 Drawing Sheets

(51) Int. Cl.
*H01B 7/04* (2006.01)
*H01B 7/18* (2006.01)

(52) U.S. Cl.
CPC ......... *H01B 7/0241* (2013.01); *H01B 7/1895* (2013.01); *H01B 7/046* (2013.01)

(56) References Cited

U.S. PATENT DOCUMENTS

| | | |
|---|---|---|
| 1,995,071 A | 3/1935 | Mackenzie |
| 2,002,061 A | 5/1935 | House |
| 2,003,001 A | 5/1935 | Leece |
| 2,118,629 A | 5/1938 | Waldron |
| 2,576,227 A | 11/1951 | Hutchins, Jr. |
| 2,604,509 A | 7/1952 | Blanchard |
| 3,115,542 A | 12/1963 | Giuseppe |
| 3,127,083 A | 3/1964 | Guyer |
| 3,217,083 A | 11/1965 | Gore |
| 3,259,675 A | 7/1966 | Bowers |
| 3,313,346 A | 4/1967 | Cross |
| 3,328,140 A | 6/1967 | Warren |
| 3,346,045 A | 10/1967 | Knapp |
| 3,482,034 A | 12/1969 | Rhoades |
| 3,490,125 A | 1/1970 | Frieling, Jr. |
| 3,554,284 A | 1/1971 | Nystrom |
| 3,567,879 A | 3/1971 | Dueker |
| 3,573,349 A | 4/1971 | Bowers |
| 3,634,607 A | 1/1972 | Coleman |
| 3,679,812 A | 7/1972 | Owens |
| 3,681,514 A | 8/1972 | Rhoades |
| 3,710,859 A | 1/1973 | Hanes |
| 3,758,704 A | 9/1973 | Naud |
| 3,766,307 A | 10/1973 | Andrews |
| 4,016,942 A | 4/1977 | Wallis, Jr. |
| 4,059,951 A | 11/1977 | Roe |
| 4,077,022 A | 2/1978 | Pitts, Jr. |
| 4,131,757 A | 12/1978 | Felkel |
| 4,131,758 A | 12/1978 | Felkel |
| 4,197,423 A | 4/1980 | Fusen |
| 4,250,351 A | 2/1981 | Bridges |
| 4,259,544 A | 3/1981 | Litauer |
| 4,281,716 A | 8/1981 | Hall |
| 4,292,588 A | 9/1981 | Smith |
| 4,409,431 A | 10/1983 | Neuroth |
| 4,486,252 A | 12/1984 | Lloyd |
| 4,522,464 A | 6/1985 | Thompson |
| 4,523,804 A | 6/1985 | Thompson |
| 4,525,813 A | 6/1985 | Burrage |
| 4,547,774 A | 10/1985 | Gould |
| 4,577,693 A | 3/1986 | Graser |
| 4,606,604 A * | 8/1986 | Soodak ............. G02B 6/4416 385/101 |
| 4,644,094 A | 2/1987 | Hoffman |
| 4,645,298 A | 2/1987 | Gartside, III |
| 4,673,041 A | 6/1987 | Turner |
| 4,675,474 A | 6/1987 | Neuroth |
| 4,696,542 A | 9/1987 | Thompson |
| 4,722,589 A | 2/1988 | Priaroggia |
| 4,729,629 A | 3/1988 | Saito |
| 4,743,711 A | 5/1988 | Hoffman |
| 4,762,180 A | 8/1988 | Wybro |
| 4,767,182 A | 8/1988 | Parfree |
| 4,768,984 A | 9/1988 | de Oliveira |
| 4,818,060 A | 4/1989 | Arroyo |
| 4,825,953 A | 5/1989 | Wong |
| 4,830,113 A | 5/1989 | Geyer |
| 4,899,823 A | 2/1990 | Cobb |
| 4,920,738 A | 5/1990 | White |
| 4,952,012 A * | 8/1990 | Stamnitz ............. G02B 6/4436 385/101 |
| 4,979,795 A | 12/1990 | Mascarenhas |
| 4,986,360 A | 1/1991 | Laky |
| 4,993,492 A | 2/1991 | Cressey |
| 5,002,130 A | 3/1991 | Laky |
| 5,088,559 A | 2/1992 | Taliaferro |
| 5,125,061 A | 6/1992 | Marlier |
| 5,125,062 A | 6/1992 | Marlier |
| 5,150,443 A | 9/1992 | Wijnberg |
| 5,329,605 A | 7/1994 | Wargotz |
| 5,339,378 A | 8/1994 | Simonds |
| 5,431,759 A | 7/1995 | Neuroth |
| 5,438,164 A | 8/1995 | Green |
| 5,495,547 A | 2/1996 | Rafie |
| 5,751,879 A | 5/1998 | Graham |
| 5,778,981 A | 7/1998 | Head |
| 5,787,217 A | 7/1998 | Traut |
| 5,857,523 A | 1/1999 | Edwards |
| 5,894,104 A | 4/1999 | Hedberg |
| 5,930,431 A | 7/1999 | Lail |
| 6,015,013 A | 1/2000 | Edwards |
| 6,030,255 A | 2/2000 | Konishi |
| 6,053,252 A | 4/2000 | Edwards |
| 6,060,662 A | 5/2000 | Rafie |
| 6,116,345 A | 9/2000 | Fontana |
| 6,161,619 A | 12/2000 | Head |
| 6,182,765 B1 | 2/2001 | Kilgore |
| 6,195,487 B1 | 2/2001 | Anderson |
| 6,211,467 B1 | 4/2001 | Berelsman |
| 6,276,456 B1 | 8/2001 | Head |
| 6,334,015 B2 | 12/2001 | Jamet |
| 6,374,023 B1 | 4/2002 | Parris |
| 6,386,290 B1 | 5/2002 | Headworth |
| 6,389,204 B1 | 5/2002 | Hurley |
| 6,392,151 B1 | 5/2002 | Rafie |
| 6,403,889 B1 | 6/2002 | Mehan |
| 6,442,304 B1 | 8/2002 | Crawley |
| 6,484,806 B2 | 11/2002 | Childers |
| 6,488,093 B2 | 12/2002 | Moss |
| 6,555,752 B2 | 4/2003 | Dalrymple |
| 6,559,383 B1 | 5/2003 | Martin |
| 6,559,385 B1 | 5/2003 | Johnson |
| 6,600,108 B1 | 7/2003 | Mydur |
| 6,631,095 B1 | 10/2003 | Bryant |
| 6,659,180 B2 | 12/2003 | Moss |
| 6,675,888 B2 | 1/2004 | Schempf |
| 6,691,775 B2 | 2/2004 | Headworth |
| 6,745,840 B2 | 6/2004 | Headworth |
| 6,747,213 B2 | 6/2004 | Bonicel |
| 6,763,889 B2 | 7/2004 | Rytlewski |
| 6,775,444 B1 | 8/2004 | Hurley |
| 6,776,195 B2 | 8/2004 | Blasko |
| 6,807,988 B2 | 10/2004 | Powell |
| 6,834,724 B2 | 12/2004 | Headworth |
| 6,843,321 B2 | 1/2005 | Carlsen |
| 6,919,512 B2 | 7/2005 | Guven |
| 7,000,903 B2 | 2/2006 | Piecyk |
| 7,116,283 B2 | 10/2006 | Benson |
| 7,119,283 B1 | 10/2006 | Varkey |
| 7,139,218 B2 | 11/2006 | Hall |
| 7,170,007 B2 | 1/2007 | Varkey |
| 7,235,743 B2 | 6/2007 | Varkey |
| 7,282,644 B1 | 10/2007 | Alvey |
| 7,288,721 B2 | 10/2007 | Varkey |
| 7,326,854 B2 | 2/2008 | Varkey |
| 7,331,393 B1 | 2/2008 | Hoel |
| 7,402,753 B2 | 7/2008 | Varkey |
| 7,462,781 B2 | 12/2008 | Varkey |
| 7,465,876 B2 | 12/2008 | Varkey |
| 7,699,114 B2 | 4/2010 | Ullah |
| 7,700,880 B2 | 4/2010 | Varkey |
| 7,719,283 B2 | 5/2010 | Ishikawa |
| 7,730,936 B2 | 6/2010 | Hernandez-Solis |
| 7,793,409 B2 | 9/2010 | Varkey |
| 7,798,234 B2 | 9/2010 | Ju |
| 7,845,412 B2 | 12/2010 | Sbordone |
| 8,011,435 B2 | 9/2011 | Carossino |
| 8,218,925 B2 | 7/2012 | Bohler |
| 8,227,697 B2 | 7/2012 | Varkey |
| 8,387,701 B2 | 3/2013 | Sbordone |
| 8,413,723 B2 | 4/2013 | Varkey |
| 8,639,075 B1 * | 1/2014 | Burnett ............. G02B 6/4431 385/100 |
| 8,807,225 B2 | 8/2014 | Varkey |
| 8,886,000 B2 | 11/2014 | Register, III |
| 8,901,425 B2 | 12/2014 | Varkey |

(56) References Cited

U.S. PATENT DOCUMENTS

| | | |
|---|---|---|
| 8,929,702 B2 | 1/2015 | Varkey |
| 8,960,271 B2 | 2/2015 | Lahijani |
| 8,969,726 B2 | 3/2015 | Varkey |
| 9,024,189 B2 | 5/2015 | Basak |
| 9,027,657 B2 | 5/2015 | Varkey |
| 9,058,921 B2 | 6/2015 | Congdon |
| 9,069,148 B2 | 6/2015 | Herbst |
| 9,091,154 B2 | 7/2015 | Weerasinghe |
| 9,182,303 B2 | 11/2015 | Lowell et al. |
| 9,188,756 B2 | 11/2015 | Register, III |
| 9,335,503 B2 | 5/2016 | Kachmar |
| 9,368,260 B2 | 6/2016 | Varkey |
| 9,412,492 B2 | 8/2016 | Varkey |
| 9,412,502 B2 | 8/2016 | Magner |
| 9,691,523 B2 | 6/2017 | Pourladian |
| 9,947,437 B2 | 4/2018 | Li et al. |
| 10,001,613 B2 | 6/2018 | Varkey |
| 10,049,789 B2 | 8/2018 | Varkey |
| 10,087,717 B2 | 10/2018 | Varkey |
| 10,215,939 B1 | 2/2019 | Varkey |
| 10,268,015 B2 | 4/2019 | Sato |
| 10,593,444 B2 | 3/2020 | Schwartz |
| 10,612,947 B2 | 4/2020 | Kishida |
| 11,268,329 B2 | 3/2022 | Varkey |
| 11,387,014 B2 | 7/2022 | Varkey |
| 2003/0011489 A1 | 1/2003 | Viswanathan |
| 2003/0082380 A1 | 5/2003 | Hager |
| 2003/0163179 A1 | 8/2003 | Hoglund |
| 2004/0163822 A1 | 8/2004 | Zhang |
| 2004/0262027 A1 | 12/2004 | Kaczmarski |
| 2005/0063650 A1* | 3/2005 | Castellani ............ G02B 6/4431 385/100 |
| 2005/0217844 A1 | 10/2005 | Edwards |
| 2005/0219063 A1 | 10/2005 | Viswanathan |
| 2006/0018611 A1 | 1/2006 | Maida |
| 2006/0024842 A1 | 2/2006 | Nylese |
| 2006/0045442 A1* | 3/2006 | Varkey ................ G02B 6/4413 385/103 |
| 2006/0104579 A1 | 5/2006 | Fitz |
| 2006/0151194 A1 | 7/2006 | Varkey |
| 2006/0187084 A1 | 8/2006 | Hernandez-Marti |
| 2006/0211286 A1 | 9/2006 | Shuey |
| 2006/0221768 A1 | 10/2006 | Hall |
| 2006/0237217 A1 | 10/2006 | Glew |
| 2006/0237218 A1 | 10/2006 | Glew |
| 2006/0242824 A1 | 11/2006 | Varkey et al. |
| 2007/0000682 A1 | 1/2007 | Varkey |
| 2007/0003780 A1 | 1/2007 | Varkey |
| 2007/0044991 A1 | 3/2007 | Varkey |
| 2007/0059499 A1 | 3/2007 | Yuasa |
| 2007/0158095 A1 | 7/2007 | Sridhar |
| 2007/0196557 A1 | 8/2007 | Weissman |
| 2008/0031578 A1* | 2/2008 | Varkey ................ G02B 6/4404 385/100 |
| 2008/0083533 A1 | 4/2008 | Malone |
| 2008/0118209 A1 | 5/2008 | Varkey |
| 2008/0156517 A1 | 7/2008 | Varkey |
| 2008/0166093 A1* | 7/2008 | Shinoski ............. G02B 6/4427 385/113 |
| 2008/0190612 A1 | 8/2008 | Buchanan |
| 2008/0247717 A1 | 10/2008 | Patlakh |
| 2008/0247718 A1 | 10/2008 | Dowd |
| 2008/0267569 A1* | 10/2008 | Ginocchio ......... G02B 6/44384 385/109 |
| 2009/0034920 A1 | 2/2009 | Dowd |
| 2009/0038149 A1 | 2/2009 | Varkey |
| 2009/0046986 A1 | 2/2009 | Maeda |
| 2009/0089998 A1 | 4/2009 | Varkey |
| 2009/0194296 A1 | 8/2009 | Gillan |
| 2009/0194314 A1 | 8/2009 | Varkey |
| 2009/0283295 A1* | 11/2009 | Varkey ................ D07B 1/162 174/105 R |
| 2010/0038112 A1 | 2/2010 | Grether |
| 2010/0255186 A1 | 10/2010 | Montes |
| 2010/0260459 A1* | 10/2010 | Bohler ............... G02B 6/4435 385/107 |
| 2011/0075979 A1 | 3/2011 | Ma |
| 2011/0232936 A1 | 9/2011 | Magner |
| 2012/0125596 A1 | 5/2012 | Homa |
| 2012/0222869 A1 | 9/2012 | Varkey |
| 2012/0257864 A1* | 10/2012 | Consonni ............ G02B 6/441 385/112 |
| 2013/0026314 A1 | 1/2013 | Hu et al. |
| 2013/0209024 A1* | 8/2013 | Lowell ................ G01L 1/242 385/12 |
| 2013/0227837 A1 | 9/2013 | Varkey |
| 2014/0212609 A1* | 7/2014 | Stratton .............. H01B 7/046 385/100 |
| 2014/0352952 A1 | 12/2014 | Varkey |
| 2015/0233200 A1* | 8/2015 | Varkey ................ E21B 23/14 166/385 |
| 2015/0294762 A1 | 10/2015 | Varkey |
| 2015/0294763 A1* | 10/2015 | Varkey ............... G02B 6/4416 385/101 |
| 2015/0348677 A1* | 12/2015 | Pourladian ........... H01B 7/226 174/107 |
| 2016/0024902 A1* | 1/2016 | Richter .............. E21B 47/00 166/250.01 |
| 2016/0025945 A1* | 1/2016 | Wanjau ................ H01B 7/046 166/250.1 |
| 2016/0222736 A1 | 8/2016 | Varkey |
| 2016/0329128 A1 | 11/2016 | Varkey |
| 2017/0268304 A1 | 9/2017 | Varkey |
| 2017/0358385 A1 | 12/2017 | Varkey |
| 2018/0025884 A1 | 1/2018 | Flitsch |
| 2018/0073310 A1 | 3/2018 | Varkey |
| 2018/0137973 A1 | 5/2018 | Varkey |
| 2018/0252884 A1 | 9/2018 | Quinn |
| 2018/0366240 A1* | 12/2018 | Varkey ................ H01B 13/24 |
| 2019/0064459 A1* | 2/2019 | Varkey .............. G02B 6/44384 |
| 2019/0170955 A1 | 6/2019 | Varkey |
| 2019/0279786 A1* | 9/2019 | Varkey ............... H01B 7/046 |
| 2020/0081209 A1* | 3/2020 | Martin Regalado ........ G02B 6/4436 |
| 2020/0123866 A1 | 4/2020 | Varkey |
| 2020/0126691 A1 | 4/2020 | Varkey |
| 2021/0055475 A1 | 2/2021 | Varkey |

FOREIGN PATENT DOCUMENTS

| | | |
|---|---|---|
| CN | 201413731 Y | 2/2010 |
| CN | 101726814 A | 6/2010 |
| CN | 101876733 A | 11/2010 |
| CN | 103502864 A | 1/2014 |
| CN | 103620465 A | 3/2014 |
| CN | 205542137 U | 8/2016 |
| CN | 106537210 A | 3/2017 |
| CN | 106716209 A | 5/2017 |
| CN | 109116494 A | 1/2019 |
| CN | 208444062 | 1/2019 |
| CN | 109581605 A | 4/2019 |
| CN | 208767077 | 4/2019 |
| EP | 0003104 A1 | 7/1979 |
| EP | 471600 A1 | 2/1992 |
| EP | 0996014 A1 | 4/2000 |
| EP | 1216342 A1 | 6/2002 |
| EP | 2039878 A1 | 3/2009 |
| EP | 3108098 A1 | 12/2016 |
| EP | 3250785 A1 | 12/2017 |
| FR | 2767861 A1 | 3/1999 |
| GB | 2234772 A | 2/1991 |
| JP | 54007186 | 1/1979 |
| JP | H0195834 A | 4/1989 |
| JP | 2216710 | 8/1990 |
| JP | H08508829 A | 9/1996 |
| JP | H10104482 A | 4/1998 |
| JP | H10170778 A | 6/1998 |
| JP | 2002243999 A | 8/2002 |
| JP | 2003151375 A | 5/2003 |
| KR | 0137668 B1 | 6/1998 |
| KR | 20000046916 A | 7/2000 |
| KR | 20120026938 A | 3/2012 |

(56) References Cited

FOREIGN PATENT DOCUMENTS

| | | | |
|---|---|---|---|
| WO | 9948111 | A1 | 9/1999 |
| WO | 0125593 | A1 | 4/2001 |
| WO | 02071178 | A2 | 9/2002 |
| WO | 2006003362 | A1 | 1/2006 |
| WO | 2006027553 | A1 | 3/2006 |
| WO | 2006088372 | A1 | 8/2006 |
| WO | 2007034242 | A1 | 3/2007 |
| WO | 2008132637 | A1 | 11/2008 |
| WO | 2011037974 | A2 | 3/2011 |
| WO | 2020264494 | A1 | 12/2020 |
| WO | 2020264498 | A1 | 12/2020 |

OTHER PUBLICATIONS

Nowak, Gerhard, "Computer design of electromechanical cables for ocean applications," in Proceedings of Tenth Annual Marine Technology Society Conference, Washington, DC, 1974, pp. 293-305.
International Search Report and Written Opinion issued in International Patent application PCT/US2022/032932 on Oct. 4, 2022, 10 pages.
First Examination Report issued in Saudi Arabia Patent Application No. 523451782, Dated Aug. 29, 2024, 13 pages with English translation.
Examination Report issued in the related CA application 2774775, dated Aug. 16, 2016, (3 pages).
Lebedev, et al., "The breakdown Strength of two-layer dlielectrics", High Voltage Engineering, 1999. Eleventh International Symposium, Conf. Publ. No. 467, vol. 4, Aug. 22-27, 1999, pp. 304-307.
Salama, et al., "Instructional design of multi-layer insulation of power cabels". Power Systems, IEEE Transactions, vol. 7, Issue 1, Feb. 1992, pp. 377-382.
International Search Report and Written Opinion issued in the related PCT application PCT/US2010/049783, dated May 9, 2011 (7 pages).
International Preliminary Report on Patentability issued in the related PCT application PCT/US2010/049783, dated Mar. 22, 2012 (5 pages).
Examination Report issued in the related AU application 2010298356, dated Oct. 19, 2015, (3 pages).
Office Action issued in the related MX application MX/a/2012/003397, dated Jun. 30, 2015 (5 pages).
International Search Report and Written Opinion issued in the related PCT application PCT/US2010/031218, dated Nov. 17, 2010 (6 pages).
International Preliminary Report on Patentability issued in the related PCT application PCT/US2010/031218, dated Oct. 18, 2011 (4 pages).
Examination Report issued in the related AU application 2010236397, dated Apr. 22, 2015, (15 pages).
Extended Search Report issued in the related EP Application 10765176.2, dated Mar. 23, 2015 (7 pages).
Office Action issued in the related EP Application 10765176.2, dated Nov. 24, 2017 (6 pages).
Extended European Search Report issued in the related EP Application 117933206.1, dated Nov. 28, 2014 (11 pages).
International Search Report and Written Opinion issued in the related PCT application PCT/US2011/039879, dated Jan. 16, 2012 (9 pages).
International Preliminary Report on Patentability issued in the related PCT application PCT/US2011/039879, dated Dec. 20, 2012 (8 pages).
Office Action issued in the related MX application MX/a/2012/013746, dated Aug. 23, 2013, (4 pages).
EP Communication Article 94-3 issued in the related EP Application 117933206.1, dated Dec. 6, 2016 (8 pages).
Examination Report issued in the related CA application 2799642, dated Mar. 13, 2017 (4 pages).
Examination Report issued in the related AU Application 2011236038, dated Jul. 28, 2015 (3 pages).
Office Action issued in the related MX application MX/a/2011/010863, dated Jan. 29, 2014, (8 pages).
Examination Report issued in the related CA application 2755231, dated Aug. 1, 2017 (5 pages).
Office Action issued in the related U.S. Appl. No. 16/113,705 dated Sep. 11, 2019 (32 pages).
Office Action issued in the related Brazil Patent Application No. PI1011343.6 dated Oct. 30, 2019, 6 pages with English translation.
Office Action issued in the related U.S. Appl. No. 16/113,705 dated Sep. 29, 2020, 13 pages.
Office Action issued in the related U.S. Appl. No. 16/724,450 dated Mar. 30, 2021, 39 pages.
First Examination report issued in Saudi Arabia patent application 120420323 on Feb. 2, 2022 (8 pages with translation).
Office Action received in NO application 20073677, dated Oct. 15, 2015 (6 pages with translation).
Examination Report issued in AU Application 2006205539, dated May 24, 2010 (2 pages).
Examination Report issued in CA Application 2594393, dated Apr. 12, 2011 (4 pages).
Office Action issued in the EP Application 06701794.7, dated Dec. 13, 2007 (2 pages).
Examination Report issued in IN Application 3079/CHENP/2007, dated May 24, 2012 (1 page).
Office Action issued in U.S. Appl. No. 16/724,450 dated Mar. 31, 2022, 13 pages.
First Office Action issued in Chinese Patent Application 201907963934 dated May 23, 2022, 13 pages with English translation.
Second Exam Report issued in Saudi Arabian Patent Application 120420323 dated Jun. 30, 2022, 14 pages with English translation.
Office Action issued in U.S. Appl. No. 16/724,450 dated Nov. 7, 2022, 15 pages.
Office Action issued in Mexico Patent Application No. MX/a/2019/010220 dated Apr. 13, 2023, 7 pages with English translation.
International Search Report and Written Opinion issued in International Patent application PCT/US2020/040118 on Oct. 15, 2020, 10 pages.
International Preliminary Report on Patentability issued in International Patent application PCT/US2020/040118, dated Jan. 6, 2022, 7 pages.
International Search Report and Written Opinion issued in International Patent application PCT/US2020/040123 on Oct. 15, 2020, 10 pages.
International Preliminary Report on Patentability issued in International Patent application PCT/US2020/040123, dated Jan. 6, 2022, 7 pages.
Exam Report issued in United Kingdom Patent Application No. GB2118164.9 dated Oct. 27, 2022, 2 pages.
Office Action issued in U.S. Appl. No. 17/621,094 dated Jan. 27, 2023, 10 pages.
JPH0195834A English translation (Year: 1989).
Office Action issued in U.S. Appl. No. 17/621,094 dated May 15, 2023, 10 pages.
Office Action issued in U.S. Appl. No. 17/621,094 dated Nov. 9, 2023, 11 pages.
First Office Action issued in China Patent Application No. 2020800475714 dated Nov. 28, 2023, 23 pages with English translation.
First Office Action issued in China Patent Application No. 2020800460615 dated Jan. 4, 2024, 20 pages with English translation.
Office Action issued in U.S. Appl. No. 17/621,144 dated Apr. 11, 2024, 19 pages.
Examination Report under section 18(3) issued in United Kingdom Patent Application No. GB2118161.5 dated Apr. 19, 2024, 2 pages.
Office Action issued in U.S. Appl. No. 17/621,094 dated Apr. 26, 2024, 16 pages.
Office Action issued in U.S. Appl. No. 17/621,144 dated Jul. 2, 2024, 10 pages.
Office Action issued in U.S. Appl. No. 17/621,144 dated Sep. 5, 2024, 18 pages.
Office Action issued in U.S. Appl. No. 17/621,094 dated Oct. 28, 2024, 50 pages.

(56) References Cited

OTHER PUBLICATIONS

Third Office Action issued in Chinese Patent Application No. 2020800575714 dated Oct. 18, 2024, 20 pages with English translation.
Exam Report issued in UAE Patent Application No. P6002391/2021 dated Oct. 11, 2024, 7 pages.

* cited by examiner

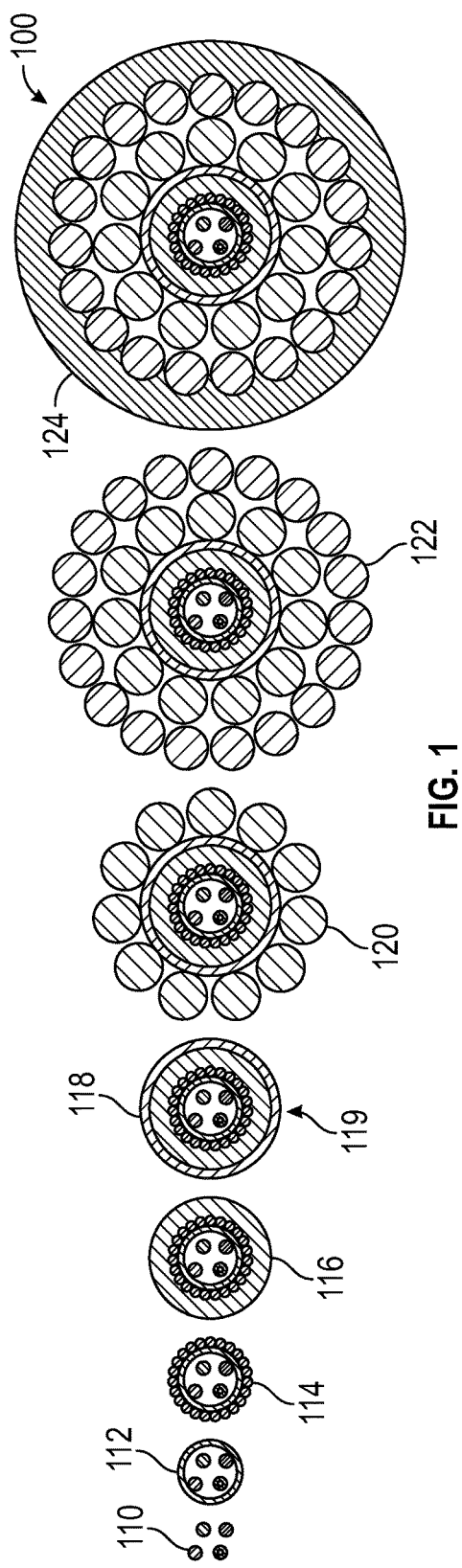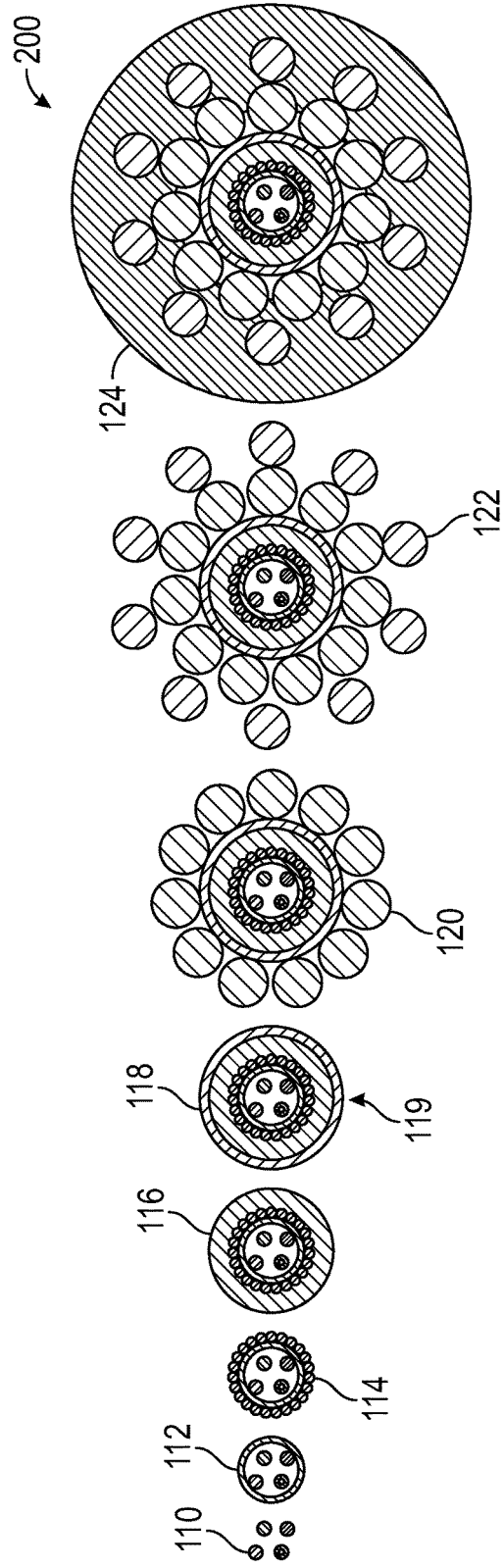

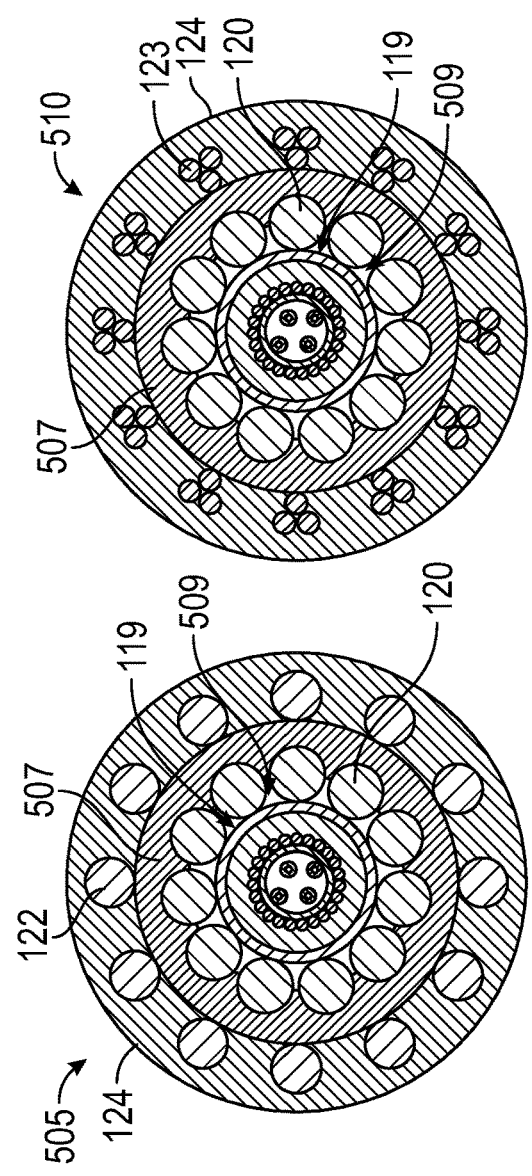
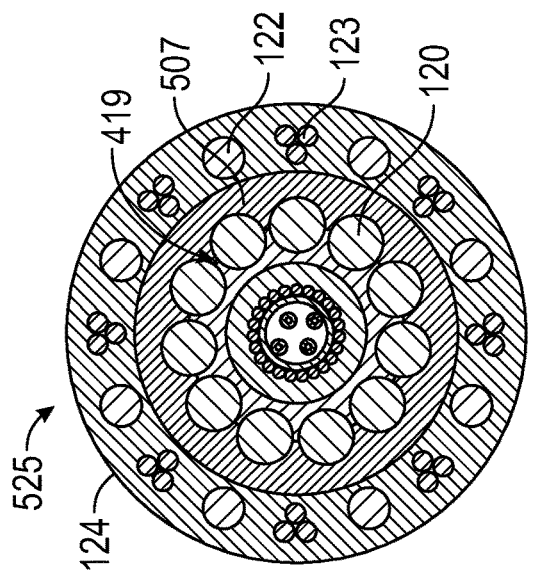
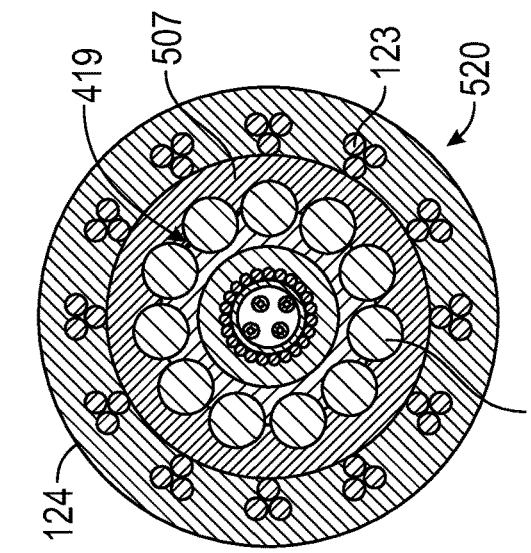
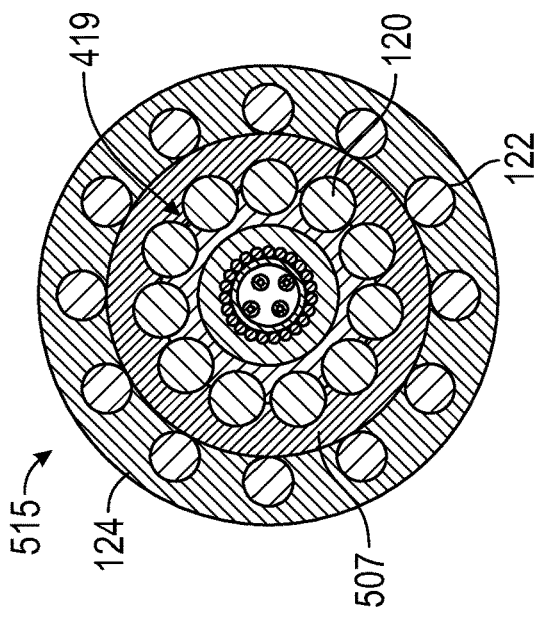
FIG. 5A  FIG. 5B  FIG. 5C  FIG. 5D  FIG. 5E

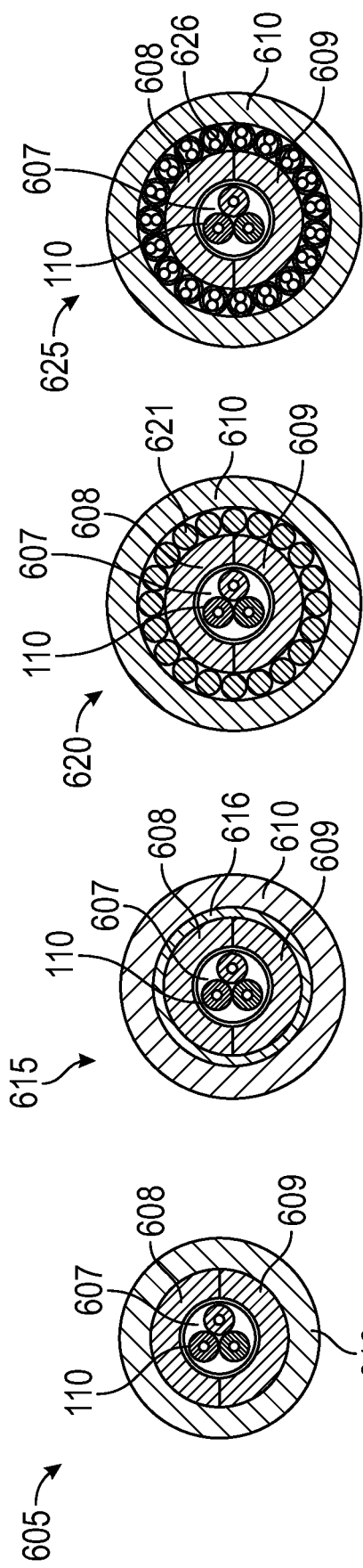
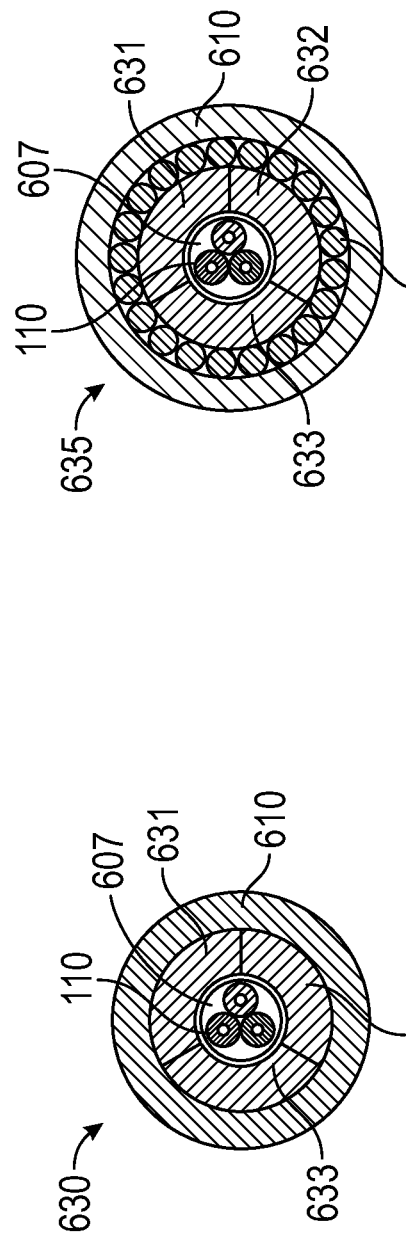
FIG. 6A  FIG. 6B  FIG. 6C  FIG. 6D  FIG. 6E  FIG. 6F

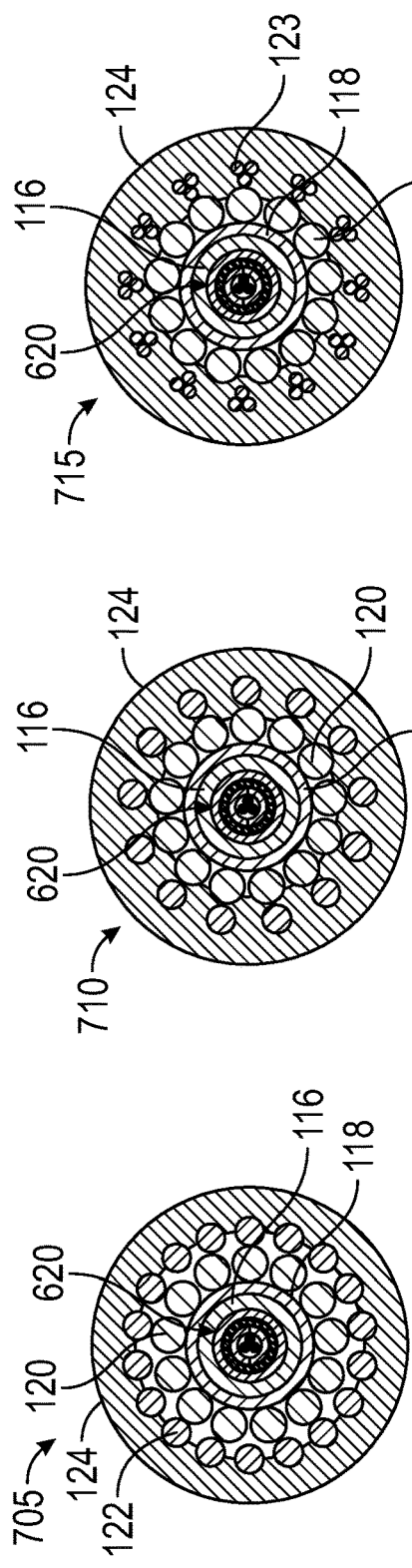
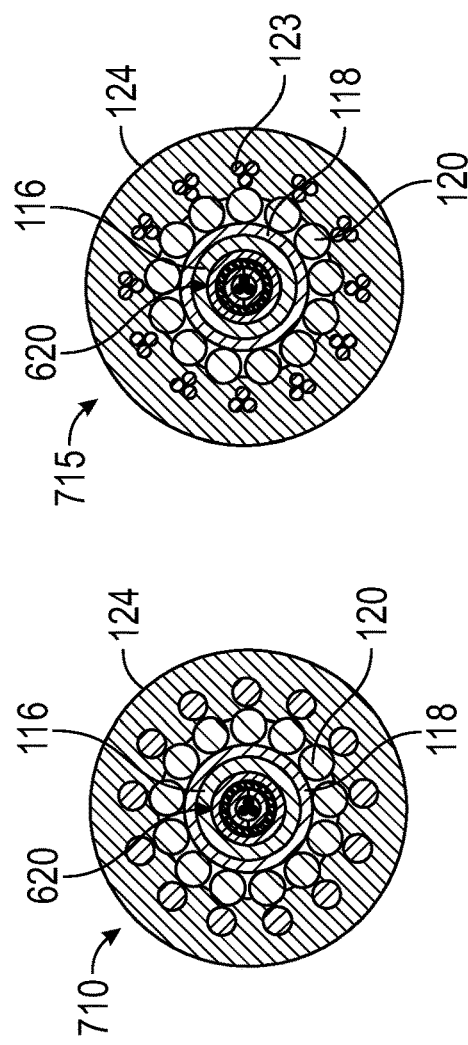
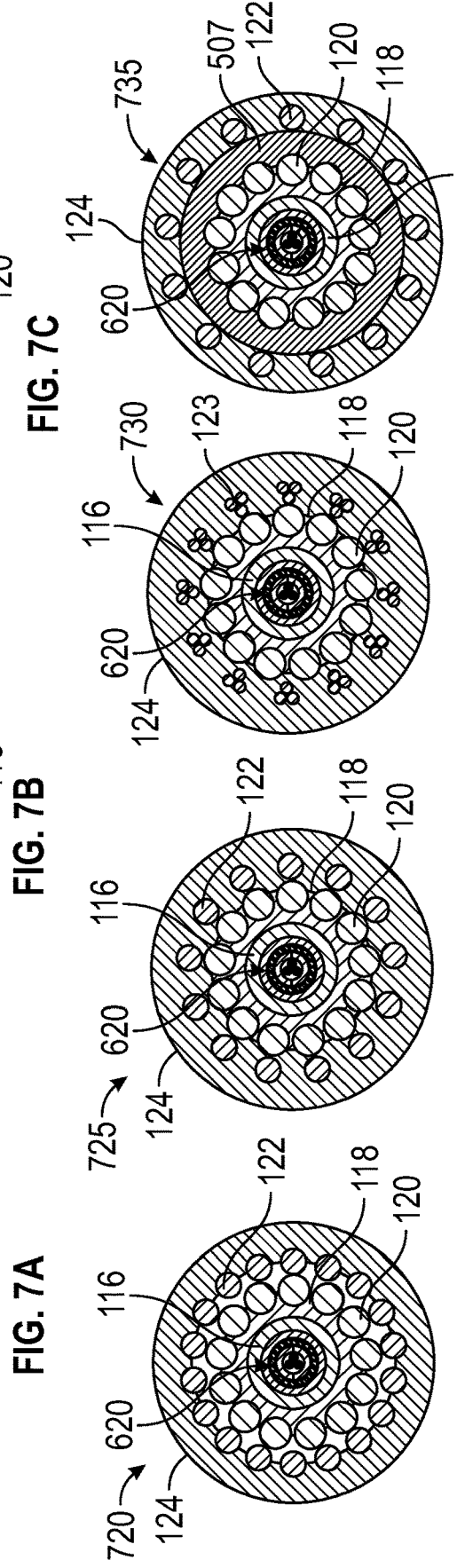

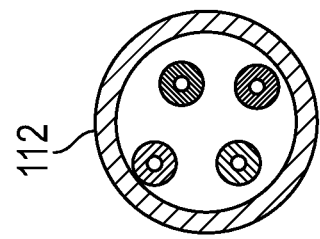
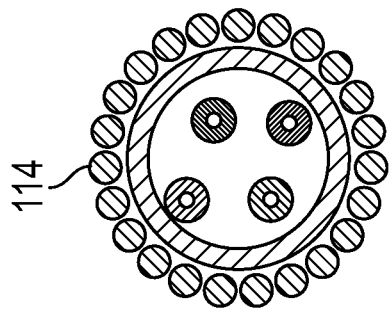
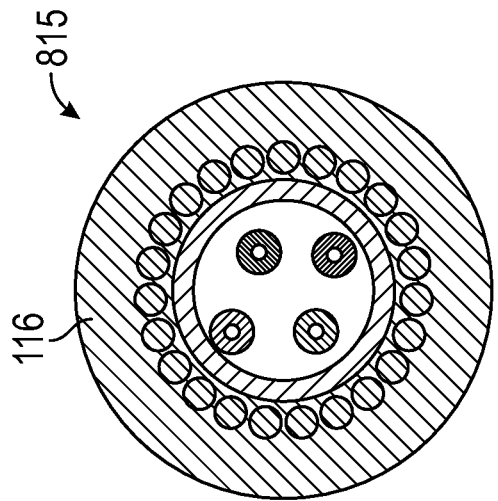
FIG. 8A
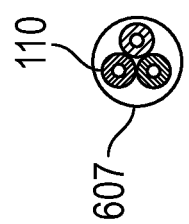
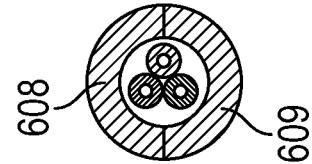
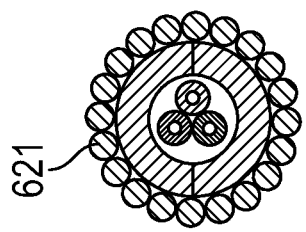
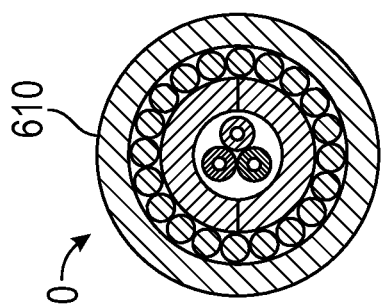
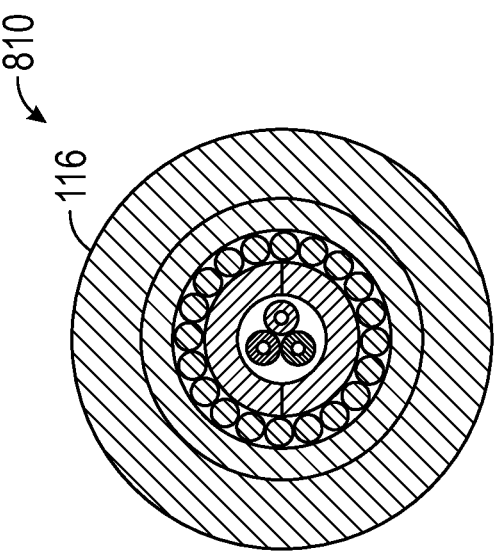
FIG. 8B

ELECTRO-OPTICAL WIRELINE CABLES

CROSS-REFERENCE TO RELATED APPLICATION

This application claims priority to U.S. Provisional Patent Application No. 63/209,031, filed on Jun. 10, 2021, which is incorporated by reference herein.

BACKGROUND

Embodiments described generally relate to cables that include at least one conductor and at least one optical fiber. The cable can be configured for use in oilfield applications.

Conventional wireline fiber optic cables that are used in oilfield applications include fiber optics packaged loosely in a metal enclosure. Metallic serve wires are applied over the metal enclosure and an insulation layer is extruded over the metallic serve wires to isolate electrical charges from ground. A jacket might be provided over the insulation to protect the core from well fluids. Two layers of armor wires are applied counter-helically over the insulation layer or the jacket to complete the conventional wireline fiber optic cable.

When such cable is used in the field where fluid is pumped down along with the cable into a well and/or fluids flow through a well having the cable disposed therein, the outer armor wires tend to open due to torque imbalance and fluid flow around the outer layer of armor wires. Due to these forces the outer layer of armor wires tends to open up, which causes erosion of the wires to take place.

There is a need, therefore, for improved cables that include at least one conductor and at least one optical fiber.

SUMMARY

Cables that include at least one conductor and at least one optical fiber are provided. In some embodiments, the cable can include an optical fiber loosely disposed within an enclosure. A conductor layer can be disposed about the enclosure. An insulation layer can be disposed about the at least one conductor layer. An inner layer of armor strength members can be helically disposed about the insulation layer. An outer layer of armor strength members can be helically disposed about the inner layer of armor strength members. The armor strength members in the outer layer of armor strength members can be at an opposite helix compared to the armor strength members in the inner layer of armor strength members. An outer jacket can be disposed about the outer layer.

In other embodiments, the cable can include an optical fiber in a coupled electro-optical package. The optical fiber can be in intimate contact with an enclosure of the electro-optical package. A conductor layer can be disposed about the electro-optical package. An insulation layer can be disposed about the at least one conductor layer. An inner layer of armor strength members can be disposed about the insulation layer. An outer layer of armor strength members can be disposed about the inner layer of armor strength members. An outer jacket can be disposed about the outer layer of armor strength members.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings.

FIG. 1 depicts an illustrative jacketed cable that includes a high coverage outer layer of armor strength members and an outer jacket disposed thereabout, according to one or more embodiments described.

FIG. 2 depicts an illustrative jacketed cable that includes a low coverage outer layer of armor strength members and an outer jacket disposed thereabout, according to one or more embodiments described.

FIGS. 5A-5E depict illustrative jacketed cables that include an intermediate jacket that separates an inner layer of armor strength members and an outer layer of armor strength members, according to one or more embodiments described.

FIGS. 6A-6F depict illustrative electro-optical packages that include at least one optical fiber in intimate contact with an enclosure of the electro-optical package, according to one or more embodiments described.

FIGS. 7A-7G depict illustrative jacketed cables that include the electro-optical package depicted in FIG. 6C as a cable core, according to one or more embodiments described.

FIG. 8A depicts an illustrative conductor that includes at least one optical fiber packaged loosely in an enclosure that further includes a conductor layer and an insulation layer disposed thereabout, according to one or more embodiments described.

FIG. 8B depicts an illustrative conductor that includes at least one optical fiber in the coupled electro-optical package depicted in FIG. 6C that further includes an insulation layer disposed thereabout, according to one or more embodiments described.

DETAILED DESCRIPTION

Figure 3:
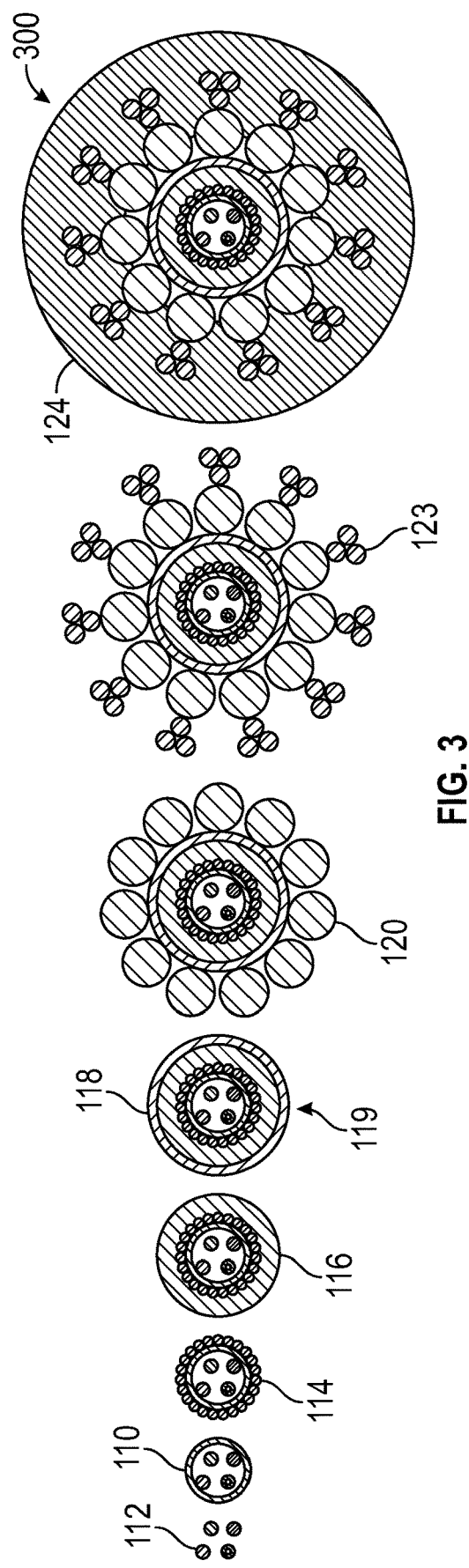
FIG. 3 depicts an illustrative jacketed cable that includes a low coverage outer layer of armor strength members, where the armor strength members include stranded armor wires, and an outer jacket disposed thereabout, according to one or more embodiments described.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions can be made to achieve certain goals, such as compliance with system-related and/or operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the claimed subject matter are discussed below. These examples are not intended to limit the scope of the disclosure. Indeed, the present disclosure may encompass a variety of forms that may be similar to or different from the examples set forth below.

It should be understood that the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

In some embodiments, a jacketed cable can include one or more optical fibers loosely disposed within an enclosure. In some embodiments, the enclosure can be a metal tube, a composite tube, or other similar enclosure. In other embodiments, a jacketed cable can include one or more optical fibers in a coupled electro-optical package, where the optical fiber(s) can be in intimate contact with an enclosure of the electro-optical package. The enclosure can be an electro-optical assembly, a metal tube, a composite tube, or other similar enclosures. In some embodiments, the electro-optical assembly can include two, three, or more keystones or wedges that can be disposed about the optical fiber(s) that can form a core of the electro-optical package. When the optical fiber(s) is in a coupled electro-optical package, a gap (on each side) between the optical fiber(s) (outer surface of a buffer jacket or single or multi-optical fiber microbundle) and enclosure (inner surface) can be from zero to 0.004" or the gap (cumulative, i.e., a sum of the gaps on opposing sides of the optical fiber(s)) can be from zero to 0.008", the optical fiber(s) is considered to be in a coupled structure or coupled electro-optical package. Optical fibers in a coupled electro-optical package are further described in WO Publication No. WO 2020/264498, which is incorporated by reference herein. As such, when the jacked cable includes one or more optical fibers loosely disposed within an enclosure the cumulative gap can be greater than 0.008".

The electro-optical package can include one or more layers disposed about the electro-optical assembly, the metal tube, the composite tube, or other similar enclosure. In some embodiments, the electro-optical package can include an outer conductor layer disposed about the electro-optical assembly, the metal tube, the composite tube, or other similar enclosure. In some embodiments, the electro-optical package can include an outer polymer layer disposed about the electro-optical assembly, the metal tube, the composite tube, or other similar enclosure. In some embodiments, a metallic or thermoplastic tape can be disposed between the electro-optical assembly, the metal tube, the composite tube, or other similar enclosure and the outer conductor or outer polymer layer. In such embodiment, the metallic or thermoplastic tape can be helically wound about the electro-optical assembly, the metal tube, the composite tube, or other similar enclosure. In other embodiments, a layer of metallic strands and/or synthetic fiber yarns can be disposed between the electro-optical assembly, the metal tube, the composite tube, or other similar enclosure and the outer conductor or outer polymer layer.

One or more conductor layers can be disposed about the enclosure or the electro-optical package. In some embodiments, a plurality, e.g., two, three, four, five, six, seven, or more, conductor layers can be disposed about the enclosure or the electro-optical package. The conductor layer(s) can be configured to transmit electricity therethrough. In some embodiments, the one or more conductor layers can be disposed about the enclosure or the electro-optical package in a helical manner. One or more conductor layers disposed about the enclosure or the electro-optical package, as used herein, means that the layers are about the enclosure or the electro-optical package, including with one or more layers of polymer or other material between the enclosure or the electro-optical package and the conductor layer(s), where at least one layer is in contact with the enclosure or the electro-optical package, or in another configuration where the layer(s) at least partially surrounds the enclosure or the electro-optical package.

In some embodiments, the one or more conductor layers can be or can include, but is not limited to, copper conductors, copper-covered steel conductors, high strength copper alloy conductors, tinned copper conductors, aluminum conductors, nickel conductors, silver conductors, copper-covered aluminum conductors, other metal conductors, other metal alloy conductors, and combinations thereof.

In some embodiments, an insulation layer can be disposed over the conductor layer to insulate an electrical charge in the conductor layer(s). The insulation layer can be or can include any insulating material such as a polymer or other material commonly used for insulating electric conductors. Examples of insulating materials can be or can include, but are not limited to, rubber, vulcanized rubber (VIR), polyethylene (PE), cross-linked polyethylene (XLPE), ethylene propylene rubber (EPR), asbestos, thermoplastic, varnished cambric material, impregnated paper, polyvinyl chloride (PVC), other low conductive materials, and combinations thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any combination thereof.

In one or more embodiments, an inner jacket can optionally be disposed over the insulation layer to protect the conductor from well fluids. In such embodiment, the inner jack can be extruded over the insulation layer. The inner jacket can be a polymer or similar material. In some embodiments, when the cable includes the optional inner jacket, a composition of the insulation layer and a composition of the inner jacket can be the same or different. Illustrative polymers that can be used to form the optional inner jacket can be or can include, but are not limited to, polyolefins, rubber, polyether ether ketone (PEEK), polyaryl ether ketone (PAEK), polyphenylene sulfide, polymers of ethylene-tetrafluoroethylene, polymers of poly (1,4-phenylene), polytetrafluoroethylene, perfluoroalkoxy polymers, fluorinated ethylene propylene, perfluoromethoxy polymers, other suitable polymeric materials, and any combination thereof. In some embodiments, the polymer can also include wear resistance particles and/or short fibers. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any combination thereof.

In some embodiments, one or more inner layers of armor strength members can be disposed about the insulation layer or the optional inner jacket. The armor strength members in the inner layer of armor strength members can be made from any suitable metal, alloy, or composite material. For example, the armor strength members in the inner layer of armor strength members can be insulated or made of a low-conductive material, such as nylon, and can be disposed about the one or more layers of conductors, such that at least one of the armor strength members can be in contact with the insulation layer or the optional inner jacket. In another example, the armor strength members in the inner layer of armor strength members, which can be insulated, low conductive material, or uninsulated, can be disposed about the conductor layer(s), where the insulation layer on the conductor layer(s), the optional inner jacket disposed about the insulation layer, or both are between the inner layer of armor strength members and the conductor layer(s). The inner layer of armor strength members can be helically disposed about the insulation layer or the optional inner jacket. The inner layer of armor strength members can be solid armor wire, stranded armor wire, or a combination of both solid and stranded armor wire. In some embodiments, stranded armor wires can include two, three, four, five, six, seven, eight, nine, ten, or more individual strands helixed together at a suitable lay angle.

In some embodiments, one or more outer layers of armor strength members can be disposed about the inner layer of armor strength members. In some embodiments, the outer layer of armor strength members can be disposed about the inner layer of armor strength members in an opposite helix as compared to the inner layer of armor strength members. The outer layer of armor strength members can be solid armor wire, stranded armor wire, or a combination of both solid and stranded armor wire. In some embodiments, stranded armor wires in the outer layer of armor strength members can include two, three, four, five, six, seven, eight, nine, ten, or more individual strands helixed together at a suitable lay angle.

In some embodiments, an outer jacket can be disposed about the one or more outer layers of armor strength members. The outer jacket can be disposed about the one or more outer layers of armor strength members such that it can be in contact with at least one of the one or more outer layers of armor strength members or where one or more other materials or components can be disposed between the one or more outer layers of armor strength members and the outer jacket. In some embodiments, the outer jacket can be disposed about the outermost layer of armor strength members. The outer jacket can be made of polymer, metal, alloys, or combinations thereof. In some embodiments, the outer jacket can provide a substantially smooth outer profile. In some embodiments, the outer jacket can be made from a polymer or polymer reinforced with carbon fiber and/or other man-made fibers. The polymer can be any polymer. Illustrative polymers be or can include, but are not limited to, polyolefins, polyether ether ketone, polyaryl ether ketone, polyphenylene sulfide, polymers of ethylene-tetrafluoroethylene, polymers of poly (1,4-phenylene), polytetrafluoroethylene, perfluoroalkoxy polymers, fluorinated ethylene propylene, perfluoromethoxy polymers, other suitable polymeric materials, and any combination thereof. In some embodiments, the polymer can also include wear resistance particles and/or short fibers.

In one or more embodiments, the outer jacket, e.g., formed from a reinforced polymer, can have a tensile elongation of greater than 15%, greater than 17%, greater than 20%, greater than 23%, or greater than 25% to survive operations while going over sheaves without cracking the outer jacket. The tensile elongation can be measured from injection, compression molded, or extruded tensile bar specimens of the outer jacket material, e.g., a reinforced polymer that includes carbon fiber and/or man-made fibers. The tensile elongation can be measured according to ASTM D638-14.

In some embodiments, a coverage of the outer layer of armor strength members can be greater than 97%. In other embodiments, a coverage of the outer layer of armor strength members can be reduced to about 30% to about 97%, which can allow the outer jacket to flow between the armor strength members in the outer layer of armor strength members and at least partially or completely fill a space between the outer layer of armor strength members and the inner layer of armor strength members. In some embodiments, the outer layer of armor strength members can have a coverage of 30%, 35%, 40%, 45%, 50%, or 55% to 60%, 65%, 70%, 75%, 80%, 85%, 90%, 95%, or 97%. The coverage of the outer layer of armor strength members can be determined by the percentage of circumference occupied by the armor strength members in the outer layer of armor strength members of a circle that has a radius from the center of the cable to the center of the outer layer of armor strength members. The coverage of the outer layer of armor strength members can be calculated as described in Nowak, Gerhard, "Computer design of electromechanical cables for ocean applications," in Proceedings of Tenth Annual Marine Technology Society Conference, Washington, D C, 1947, pp. 293-305.

In some embodiments, when the cable includes the optional inner jacket, at least one of the inner layers of armor strength members can be at least partially or fully embedded into the inner jacket. For example, the one or more conductor layers can include an insulation layer disposed thereabout, the insulation layer can include the inner jacket disposed thereabout, and at least one layer of inner armor strength members can be at least partially or fully embedded into the inner jacket. Accordingly, at least a portion of any space between the inner layer of armor strength members and the inner jacket can be at least partially filled or fully filled.

In some embodiments, at least a portion of the inner layer of armor strength members can be separated from at least a portion of the outer layer of armor strength members. For example, the outer jacket can be extruded such that it can extend between the inner layer of armor strength members and the outer layer of armor strength members, an intermediate polymer layer can be disposed between the inner layer of armor strength members and the outer layer of armor strength members, or a combination thereof. Accordingly, the inner layer of armor strength members can be at least partially or completely isolated from the outer layer of armor strength members.

In some embodiments, the cable can be used for distributed measurement such as vibration, acoustics, strain, temperature, and other distributed measurements for oilfield operations. For example, the measurements can include, but are not limited to, distributed vibration sensing (DVS), heterodyne distributed vibration sensing (hDVS), distributed acoustic sensing (DAS), distributed strain and temperature sensing (DSTS), distributed temperature sensing (DTS), or combinations thereof. In some embodiments, the cable can be used with a tractor for taking the distributed measurement. In some embodiments, the cable can be used for fiber optics telemetry purposes with any oilfield tool(s) for oilfield operations. In some embodiments, the cable can be used for copper and fiber optics telemetry purposes with any oilfield tool(s) for oilfield operations. In some embodiments, the cable can be used for copper and fiber optics telemetry and can be capable of switching between them with any oilfield tools for oilfield operations. In some embodiments, the cable can be used for pump down operations in oilfield operations. In some embodiments, the cable can be deployed into a well, where fluid in the well can be allowed to flow with the cable inside the well to collect distributed measurements through the at least one optical fiber. In some embodiments, the cable can be deployed into a well to detect leakages in the wellbore in oilfield operations, monitor the well while fracking, take other measurements, or combinations thereof. In some embodiments, the cable can have a mono, coaxial, triad, quad, or hepta wireline cable structure.

FIG. 1 depicts an illustrative jacketed cable 100 that includes a high coverage outer layer of armor strength members 122 and an outer jacket 124 disposed thereabout, according to one or more embodiments. The jacketed cable 100 can include one or more optical fibers 110. The optical fibers 110 can be loosely disposed within an enclosure 112. The enclosure 112 can be a tube or other encasing. In some embodiments, the enclosure 112 can include a gel or relatively soft polymer, e.g., silicone, disposed therein. One or more conductor layers 114 can be disposed about the enclosure 112. In some embodiments, the jacketed cable 100 can include a plurality of conductor layers 114, e.g., two, three, four, five, or more conductor layers. In some embodiments, the conductor layer 114 can be helically disposed about the enclosure 112. In some embodiments, when the conductor layer 114 includes two or more conductor layers, adjacent layers can be disposed about the enclosure at an opposite helix.

In some embodiments, an insulation layer 116 can be disposed about the conductor layer(s) 114. The insulation layer 116 can operatively isolate the conductor layer(s) 114 from ground. In some embodiments, an optional inner jacket 118 can be disposed about the insulation layer 116. The inner jacket 118 can be configured to protect the conductor layers 114 and optical fibers 110 from fluids. The assembly of the optical fiber(s) 110, the enclosure 112, the conductor layer 114, the insulation layer 116, and the optional inner jacket 118 can be referred to as a cable core 119.

A first or inner layer of armor strength members 120 can be disposed about the insulation layer 116 or, when present, the optional inner jacket 118. The inner layer of armor strength members 120 can be helically disposed about the insulation layer 116 or, when present, the optional inner jacket 118. A second or outer layer of armor strength members 122 can disposed about the inner layer of armor strength members 120. The outer layer of armor strength members 122 can be helically disposed about the inner layer of armor strength members 120. In some embodiments, the armor strength members in the outer layer of armor strength members 122 can be at an opposite helix compared to the armor strength members in the inner layer of armor strength members 120. In some embodiments, the inner layer of armor strength members 120 can have a coverage of greater than 97% up to about 100%. In some embodiments, the outer layer of armor strength members can have a coverage of greater than 97% to about 100%. In other embodiments, the inner layer of armor strength members 120 and the outer layer of armor strength members can each have a coverage of greater than 97% to about 100%.

An outer jacket 124 can be disposed over the outer layer of armor strength members 122. In some embodiments, the outer jacket 124 can be or can include, but is not limited to, a polymer, a metal, a reinforced polymer, or a combination thereof. In some embodiments, the outer jacket 124 can be or can include a short-fiber reinforced fluoropolymer or any other short-fiber reinforced polymer. In some embodiments, the outer jacket 124 can be extruded over the outer layer of armor strength members 122. The short fibers that can be used in the reinforced polymer can be or can include any man-made fiber including fiber glass, carbon fiber, ceramic fibers, or combinations thereof. The tensile elongation of the material used to form the outer jacket 124 can be adjusted to be greater than 15%, which can allow flexibility of the jacketed cable 100 around a sheave. In some embodiments, when the outer jacket 124 is reinforced with short fibers, the elongation can be adjusted by controlling the fiber length and/or fiber concentration. The outer jacket 124 can prevent the outer layer of armor strength members 122 from opening while pumping fluids in a well.

FIG. 2 depicts an illustrative jacketed cable 200 that includes a low coverage outer layer of armor strength members 122 and an outer jacket 124 disposed thereabout, according to one or more embodiments. The jacketed cable 200 can include the one or more optical fibers 110, the enclosure 112, the one or more conductors 114, the insulation layer 116, optionally the inner jacket 118, the inner layer of armor strength members 120, the outer layer of the armor strength members 122, and the outer jacket 124. Similar to the jacketed cable 100, the assembly of the optical fiber(s) 110, the enclosure 112, the conductor layer 114, the insulation layer 116, and the optional inner jacket 118 can be referred to as a cable core 119. The outer layer of armor strength members 122 can have a coverage from about 30% to about 97%. In some embodiments, the inner layer of armor strength members 120 can have a coverage from about 30% to about 97% or greater than 97% to about 100%.

The inner layer of armor strength members 120 can be helically disposed about the insulation layer 116 or, when present, the optional inner jacket 118. The outer layer of armor strength members 122 can be helically disposed about the inner layer of armor strength members 120. In some embodiments, the armor strength members in the outer layer of armor strength members 122 can be at an opposite helix compared to the armor strength members in the inner layer of armor strength members 120.

In some embodiments, when the coverage of the outer armor strength members in the outer layer of armor strength members 122 is about 30% to about 97%, material from the outer jacket 124 can at least partially fill any space between the outer layer of armor strength members 122 and the inner layer of armor strength members 120. For example, a compression polymer extrusion technique can be used to apply the outer jacket 124 that can cause the polymer of the outer jacket 124 to flow between the outer layer of armor strength members 122 to fill partially or fully any space between the outer layer of armor strength members 122 and the inner layer of armor strength members 120.

The optical fibers 110 can be packaged loosely in the enclosure 112, such as a metal tube. In some embodiments, the enclosure 112 can include a gel disposed therein. In some embodiments, man-made short fibers can be used in the outer jacket 124. The short fibers can be any type of strength fiber or mixture of strength fibers. The short fibers can be glass fiber, carbon fiber, ceramic fibers, or other now known or future known fibers. The tensile elongation of the material used to form the outer jacket 124 can be adjusted to be greater than 15%, which can allow flexibility of the jacketed cable 100 around a sheave. The outer jacket 124 can prevent the outer layer of armor strength members 122 from opening while pumping fluids in a well. In some embodiments, when the outer jacket 124 is reinforced with short fibers, the elongation can be adjusted by controlling the fiber length and/or fiber concentration.

FIG. 3 depicts another illustrative jacketed cable 300 that includes a low coverage outer layer of armor strength members 123 and an outer jacket 124, according to one or more embodiments. The jacketed cable 300 can include the one or more optical fibers 110, the enclosure 112, the one or more conductors 114, the insulation layer 116, optionally the inner jacket 118, the inner layer of armor strength members 120, an outer layer of armor strength members 123, and the outer jacket 124. Similar to the jacketed cables 100 and 200, the assembly of the optical fiber(s) 110, the enclosure 112, the conductor layer 114, the insulation layer 116, and the optional inner jacket 118 can be referred to as a cable core 119.

As shown in FIG. 3, the outer layer of armor strength members 123 can include stranded armor strength members. For example, the outer armor strength members 123 can include two, three, four, five, six, seven, eight, nine, ten, or more stranded armor strength members that can be helixed at a suitable lay angle. Similar to the jacketed cable 200, the outer layer of armor strength members 123 can have a coverage from about 30% to about 97%. As such, the material from the outer jacket 124 can at least partially fill spaces between the outer layer of armor strength members 123 and the inner layer of armor strength members 120. In some embodiments, the inner layer of armor strength members 120 can have a coverage from about 30% to about 97% or greater than 97% to about 100%.

Figure 4A:
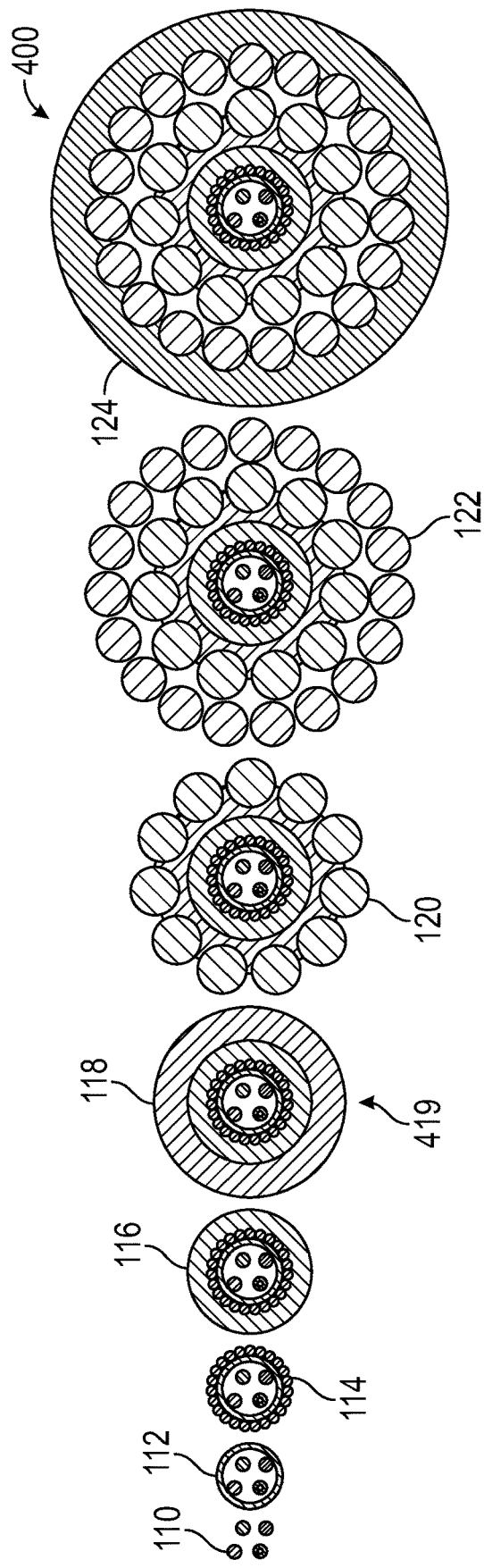
FIGS. 4A-4C depict illustrative jacketed cables that include an optional inner jacket that can have a thickness sufficient to allow an inner layer of armor strength members disposed thereabout to be at least partially or completely embedded therein, according to one or more embodiments described.
Figure 4B:
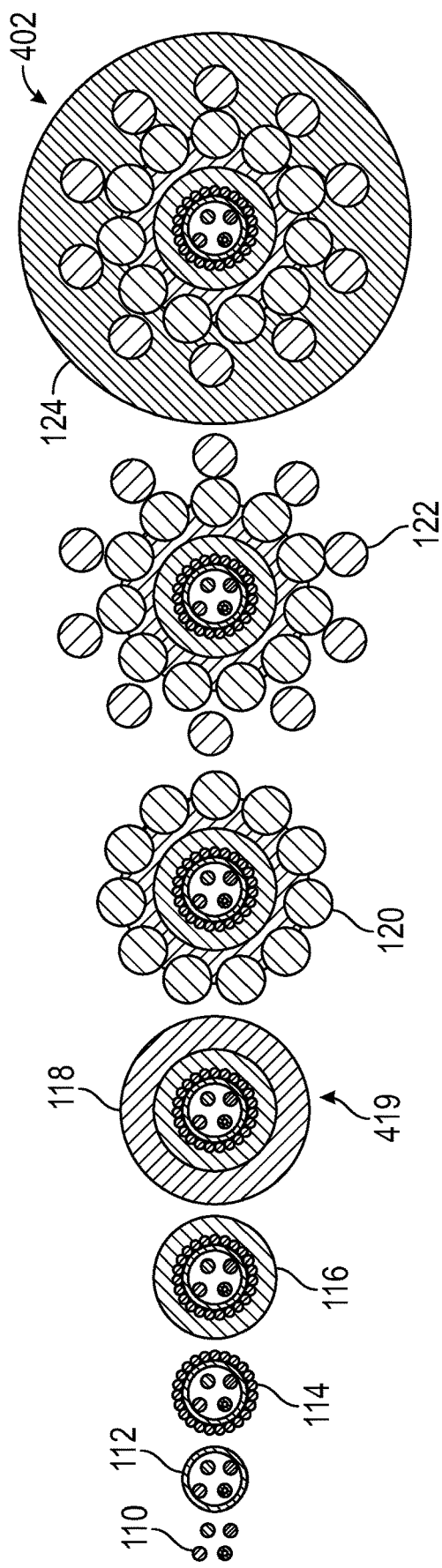
Figure 4C:
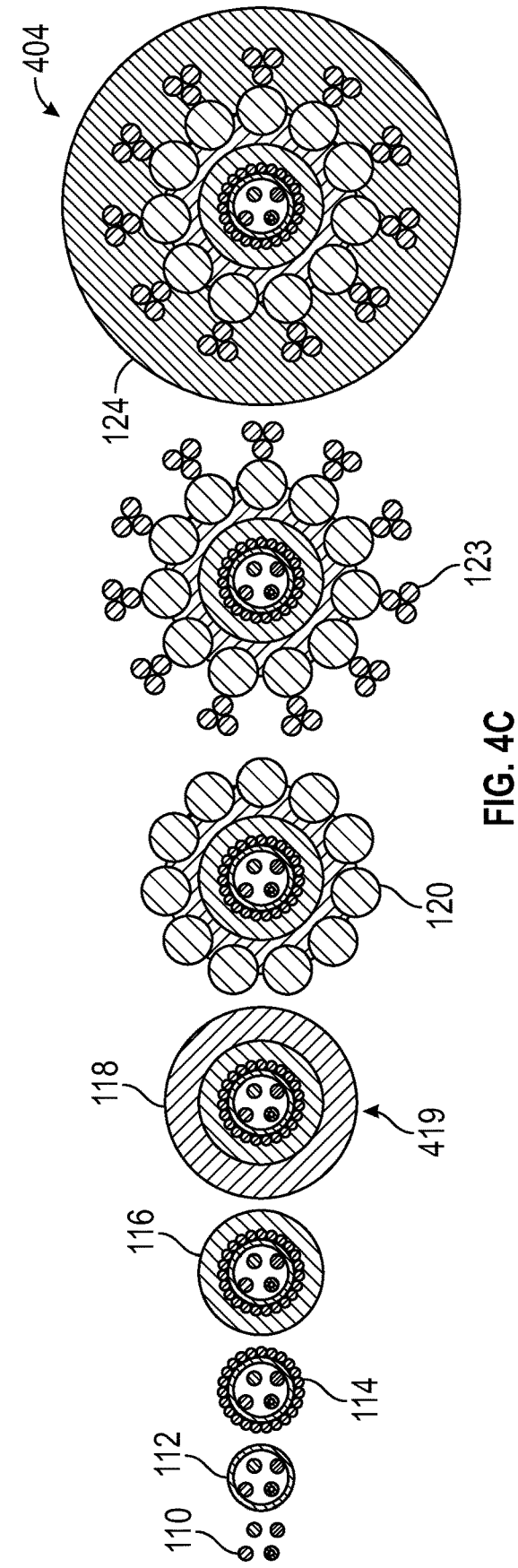

FIGS. 4A-4C depict illustrative jacketed cables 400, 402, and 404, respectively, that include the optional inner jacket 118 that can have a thickness sufficient to allow the inner layer of armor strength members 120 disposed thereabout to be at least partially or completely embedded therein, according to one or more embodiments. As shown in FIGS. 4A-4C, the inner layer of armor strength members 120 are partially embedded within the inner jacket 118. In other embodiments, however, the thickness of the inner jacket 118 can be sufficient to permit the inner layer of armor strength members 120 to be completely embedded within the inner jacket 118.

In addition to the inner jacket 118 and the inner layer of armor strength members 120, the jacketed cables 400 and 402 can include the one or more optical fibers 110, the enclosure 112, the one or more conductor layers 114, the insulation layer 116, the outer layer of armor strength members 122, and the outer jacket 124. In addition to the inner jacket 118 and the inner layer of armor strength members 120, the jacketed cable 404 can include the one or more optical fibers 110, the enclosure 112, the one or more conductor layers 114, the insulation layer 116, the outer layer of armor strength members 123, and the outer jacket 124. The assembly of the optical fiber(s) 110, the enclosure 112, the conductor layer 114, the insulation layer 116, and the optional inner jacket 118 that has a thickness sufficient to allow the inner layer of armor strength members 120 disposed thereabout to be at least partially or completely embedded therein can be referred to as a cable core 419.

FIGS. 5A-5E depict illustrative jacketed cables 505, 510, 515, 520, and 525 that include an intermediate jacket 507 that separates the inner layer of armor strength members 120 and the outer layer of armor strength members 122 and/or 123, according to one or more embodiments. The intermediate jacket 507 can be in contact with the outer jacket 124, the insulation layer 116 or the optional inner jacket, the inner layer of armor strength members 120, the outer layer of armor strength members 122, or combinations thereof. The intermediate jacket 507 can be a polymer or similar material. Illustrative polymers be or can include, but are not limited to, polyolefins, polyether ether ketone, polyaryl ether ketone, polyphenylene sulfide, polymers of ethylene-tetrafluoroethylene, polymers of poly (1,4-phenylene), polytetrafluoroethylene, perfluoroalkoxy polymers, fluorinated ethylene propylene, perfluoromethoxy polymers, trifluoromethoxy polymers, other suitable polymeric materials, and any combination thereof. In some embodiments, the polymer can also include wear resistance particles and/or short fibers.

The jacketed cables 505 and 510 can each include the cable core 119 such that spaces or voids 509 can be present between the cable core 119 and the inner layer of armor strength members 120. The jacketed cables 515, 520, and 525 can each include the cable core 419 such that any spaces or voids between the cable core 419 and the inner layer of armor strength members 120 can be partially filled or fully filled. The outer layer of armor strength members 122 in the jacketed cables 505 and 515 can be made up of solid armor wires. The outer layer of armor strength members 123 in the jacketed cables 510 and 520 can be made up of stranded armor wires. The outer layer of armor strength members 122, 123 in the jacketed cable 525 can include both solid armor wires and stranded armor wires.

FIGS. 6A-6F depict illustrative electro-optical packages 605, 615, 620, 625, 630, and 635 that include at least one optical fiber 110 in intimate contact with an enclosure 608/609 or 631/632/633, according to one or more embodiments. In some embodiments, when the coupled electro-optical packages 605, 615, 620, 625, 630, and 635 include two or more optical fibers 110, the two or more optical fibers 110 can be stranded in a helix at any suitable lay angle to form a fiber bundle. The coupled electro-optical packages 605, 615, 620, and 625 can include the optical fiber(s) 110 disposed between keystones 608/609. The coupled electro-optical packages 630 and 635 can include the optical fiber(s) 110 disposed between keystones 631/632/633.

The keystones 608/609 and the keystones 631/632/633 can be arranged about the optical fiber(s) 110 to form a tubular structure or enclosure thereabout. In some embodiments, a cumulative gap between the inner surface of the enclosure formed by keystones 608/609 and keystones 631/632/633 can be less than or equal to 0.008", less than or equal to 0.006", less than or equal to 0.004", or less than or equal to 0.002" such that the optical fiber(s) is in intimate contact with the enclosure of the electro-optical package 605, 615, 620, 625, 630, and 635. In some embodiments, the cumulative gap between the inner surface of the enclosure formed by keystones 608/609 and keystones 631/632/633 can be from 0", 0.001", or 0.002" to 0.003", 0.005", 0.007", or 0.008". In some embodiments, the keystones 608, 609, 631, 632, and 633 can be or can include one or more metals.

In some embodiments, the metal can be or can include, but is not limited to, copper, copper-covered steel, high strength copper alloys, tinned copper, aluminum, nickel, silver, copper-covered aluminum, other metal conductors, other metal alloy conductors, and combinations thereof.

In some embodiments, a gel or soft polymer, e.g., silicone, 607 can optionally be disposed about the optical fiber(s) 110. In some embodiments, at least one conductor layer 610 can be disposed about keystones 608/609 and about keystones 631/632/633. In some embodiments, the conductor layer 610 can be made up of one or more layers of metal wires, metal tape, metal ribbon, metal foil, or other form of metal, or combinations thereof. In some embodiments, the conductor layer 610 can be or can include, but is not limited to, copper, copper-covered steel, high strength copper alloys, tinned copper, aluminum, nickel, silver, copper-covered aluminum, other metal conductors, other metal alloy conductors, and combinations thereof. In other embodiments, at least layer 610 can be a polymer layer instead of a conductor. Such polymer in the layer 610 can be or can include, any one or more of the polymers described herein suitable for one or more of the other layers in the cables disclosed herein.

In some embodiments, as shown in the electro-optical package 615, one or more layers 616 of a metallic or thermoplastic tape can be disposed about the keystones 608/609 such that the layer 616 can be disposed between the keystones 608/609 and the conductor layer 610. In other embodiments, as shown in the electro-optical packages 620 and 635, one or more layers 621 of metal wires or strands can be disposed about the keystones 608/609 and 631/632/633, respectively, such that the layer 621 can be disposed between the keystones 608/609 or 631/632/633 and the conductor layer 610, respectively. In some embodiments, the metal wires or strands in layer 621 can be helically disposed about the keystones 608/609 and keystones 631/632/633. In still other embodiments, as shown in the electro-optical package 625, one or more layers 626 of fibers can be disposed about the keystones 608/609 such that the layer 626 can be disposed between the keystones 608/609 and the conductor layer 610. In some embodiments, the fibers in layer 626 can be helically disposed about the keystones 608/609. In some embodiments, the fibers that can be used to form layer 626 can be or can include, but are not limited to, glass fibers, ceramic fibers, carbon fibers, or any combination thereof. It should be understood that any of the electro-optical packages 605, 615, 620, 625, 630, and 635 can include any desired layer 616, 621, 626 or any combination of layers 616, 621, 626 disposed between keystones 608/609 and/or keystones 631/632/633.

In some embodiments, the layer, e.g., the conductor layer 610, the layer 616 of metallic or thermoplastic tape, the layer 621 of metal wires or strands, the layer 626 of fibers, or any other layer immediately disposed about the keystones 608/609 or the keystones 631/632/633 can hold or otherwise maintain the keystones 608/609 and keystones 631/632/633 in place about the optical fiber(s) 110. The layer 610, when a polymer, can serve as insulation and contain electrical charges.

FIGS. 7A-7G depict cables 705, 710, 715, 720, 725, 730, and 735, respectively, that include the electro-optical package 620 depicted in FIG. 6 as a cable core, according to one or more embodiments. As shown in FIGS. 7A-7G, the insulation layer 116 can be disposed about the electro-optical package 620 and the optional inner jacket 118 can be disposed about the insulation layer 116. The cable 705 can include the inner layer of armor strength members 120, the outer layer of armor strength members 122, and the outer jacket 124 disposed about the optional inner jacket 118 as discussed above with regard to the jacketed cable 100. The cable 710 can include the inner layer of armor strength members 120, the outer layer of armor strength members 122, and the outer jacket 124 disposed about the optional inner jacket 118 as discussed above with regard to the jacketed cable 200. The cable 715 can include the inner layer of armor strength members 120, the outer layer of armor strength members 122, and the outer jacket 124 disposed about the optional inner jacket 118 as discussed above with regard to the jacketed cable 300. The cable 720 can include the inner layer of armor strength members 120, the outer layer of armor strength members 122, and the outer jacket 124 disposed about the optional inner jacket 118 as discussed above with regard to the jacketed cable 400. The cable 725 can include the inner layer of armor strength members 120, the outer layer of armor strength members 122, and the outer jacket 124 disposed about the optional inner jacket 118 as discussed above with regard to the jacketed cable 402. The cable 730 can include the inner layer of armor strength members 120, the outer layer of armor strength members 122, and the outer jacket 124 disposed about the optional inner jacket 118 as discussed above with regard to the jacketed cable 404. The cable 735 can include the inner layer of armor strength members 120, the intermediate jacket 507, the outer layer of armor strength members 122, and the outer jacket 124 disposed about the optional inner jacket 118 as discussed above with regard to the jacketed cable 515.

It should be understood that other cables that include any one of the electro-optical packages 605, 615, 620, 625, 630, and 635 as the cable core that include the insulation layer 116 and, optionally, the inner jacket 118 disposed thereabout can further include the inner layer of armor strength members 120, the outer layer of armor strength members 122, and the outer jacket 124 disposed about the electro-optical package or the optional inner jacket 118 as discussed above with regard to any of the embodiments shown and described in any one of FIGS. 1, 2, 3, 4A-4C, and 5A-5E.

FIG. 8A depicts a conductor 815 that includes at least one optical fiber 110 packaged loosely in an enclosure 112 that further includes the conductor layer 114 and the insulation layer 116 disposed thereabout, according to one or more embodiments. FIG. 8B depicts a conductor 810 that includes at least one optical fiber 110 in the coupled electro-optical package 620 depicted in FIG. 6C that further includes the insulation layer 116 disposed thereabout, according to one or more embodiments. In some embodiments, the conductors 815 and 810 can be used as the cable core in any one or more of the embodiments shown and described in any one of FIGS. 1, 2, 3, 4A-4C, 5A-5E, and 7A-7G. In some embodiments, the conductors 815 and 810 can be used as the cable core in any one or more of the embodiments shown and described in any one of FIGS. 1, 2, 3, 4A-4C, 5A-5E, and 7A-7G in a mono, a coaxial, a triad, a quad, or a hepta wireline cable structure. It should be understood that any one of the jacketed cables described in any one of FIGS. 1, 2, 3, 4A-4C, 5A-5E, and 7A-7G can be used in a mono, a coaxial, a triad, a quad, or a hepta wireline cable structure. Additionally, any combination of the jacked cables described in any one of FIGS. 1, 2, 3, 4A-4C, 5A-5E, and 7A-7E can be used in a coaxial, a triad, a quad, or a hepta wireline cable structure.

The present disclosure further relates to any one or more of the following numbered paragraphs:

1. A cable comprising: an optical fiber loosely disposed within an enclosure; a conductor layer disposed about the enclosure; an insulation layer disposed about the at least one conductor layer; an inner layer of armor strength members helically disposed about the insulation layer; an outer layer of armor strength members helically disposed about the inner layer of armor strength members, wherein the armor strength members in the outer layer of armor strength members are at an opposite helix compared to the armor strength members in the inner layer of armor strength members; and an outer jacket disposed about the outer layer.

2. The cable of paragraph 1, further comprising an inner jacket disposed between the insulation layer and the inner layer of armor strength members.

3. The cable of paragraph 2, wherein at least one of the armor strength members in the inner layer of armor strength members is at least partially embedded into the inner jacket.

4. The cable of paragraph 2 or 3, wherein the inner jacket partially fills any space between the inner layer of armor strength members and the inner jacket.

5. The cable of paragraph 2 or 3, wherein the inner jacket completely fills any space between the inner layer of armor strength members and the inner jacket.

6. The cable of any one of paragraphs 1 to 5, wherein the conductor layer comprises a plurality of conductor layers, and wherein each of the conductor layers is helically disposed about the enclosure.

7. The cable of paragraph 6, wherein adjacent conductor layers in the plurality of conductor layers are at an opposite helix with respect to one another.

8. The cable of any one of paragraphs 1 to 7, wherein the outer jacket is a polymer, a metal, a reinforced polymer, or a combination thereof.

9. The cable of any one of paragraphs 1 to 8, wherein a coverage of the outer layer of armor strength members is from about 30% to about 97%, and wherein the coverage of the outer layer of armor strength members allows the outer jacket to flow between the armor strength members in the outer layer of armor strength members and at least partially fill a space between the outer layer of armor strength members and the inner layer of armor strength members.

10. The cable of any one of paragraphs 1 to 9, wherein the armor strength members in the outer layer of armor strength members comprise solid armor wire, stranded armor wire, or a combination thereof.

11. The cable of any one of paragraphs 1 to 10, wherein the armor strength members in the outer layer of armor strength members comprise stranded armor wire, and wherein the stranded armor wire comprises three or more armor strength members helixed together at a lay angle.

12. The cable of any one of paragraphs 1 to 11, further comprising a polymer disposed between the inner layer of armor strength members and the outer layer of armor strength members, and wherein the polymer isolates at least a portion of the inner layer of armor strength members from the outer layer of armor strength members.

13. The cable of any one of paragraphs 1 to 12, wherein the outer jacket comprises a polymer, a fiber reinforced polymer, or a combination thereof.

14. The cable of paragraph 13, wherein the outer jacket comprises the fiber reinforced polymer, and wherein the fibers comprise carbon fibers, glass fibers, metal fibers, or a combination thereof.

15. The cable of any one of paragraphs 1 to 14, wherein the fiber-reinforced polymer has a tensile elongation of greater than 15%.

16. A cable comprising: an optical fiber in a coupled electro-optical package, wherein the optical fiber is in intimate contact with an enclosure of the electro-optical package; a conductor layer disposed about the electro-optical package; an insulation layer disposed about the at least one conductor layer; an inner layer of armor strength members disposed about the insulation layer; an outer layer of armor strength members disposed about the inner layer of armor strength members; and an outer jacket disposed about the outer layer of armor strength members.

17. The cable of paragraph 16, further comprising an inner jacket disposed between the insulation layer and inner layer of armor strength members.

18. The cable of paragraph 17, wherein at least one of the armor strength members in the inner layer of armor strength members is at least partially embedded into the inner jacket.

19. The cable of paragraph 17 or 18, wherein the inner jacket partially fills any space between the inner layer of armor strength members and the inner jacket.

20. The cable of paragraph 17 or 18, wherein the inner jacket completely fills any space between the inner layer of armor strength members and the inner jacket.

21. The cable of any one of paragraphs 16 to 20, wherein the outer jacket is a polymer, a metal, a reinforced polymer, or a combination thereof.

22. The cable of any one of paragraphs 16 to 21, wherein the conductor layer comprises a plurality of conductor layers, and wherein the each of the conductor layers is helically disposed about the electro-optical package.

23. The cable of paragraph 22, wherein adjacent conductor layers in the plurality of conductor layers are at an opposite helix with respect to one another.

24. The cable of any one of paragraphs 16 to 23, wherein a coverage of the outer layer of armor strength members is from about 30% to about 97%, and wherein the coverage of the outer layer of armor strength members allows the outer jacket to flow between the outer layer of armor strength members and at least partially fill any space between the outer layer of armor strength members and the inner layer of armor strength members.

25. The cable of any one of paragraphs 16 to 24, wherein the outer layer of armor strength members comprises solid armor wire, stranded armor wire, or a combination thereof.

26. The cable of paragraph 25, wherein the outer layer of armor strength members comprises the stranded armor wire, and wherein the stranded armor wire comprises three or more armor strength members helixed together at a lay angle.

27. The cable of any one of paragraphs 16 to 26, further comprising a polymer disposed between the inner layer of armor strength members and the outer layer of armor strength members, and wherein the polymer isolates at least a portion of the inner layer of armor strength members from the outer layer of armor wire strength members.

28. The cable of any one of paragraphs 16 to 27, wherein the outer jacket comprises a polymer, a fiber reinforced polymer, or a combination thereof.

29. The cable of paragraph 28, wherein the outer jacket comprises the fiber reinforced polymer, and wherein the fibers are carbon fibers, glass fibers, metal fibers, or a combination thereof.

30. The cable of paragraph 28 or 29, wherein the fiber-reinforced polymer has a tensile elongation of greater than 15%.

31. The cable of any one of paragraphs 16 to 30, wherein the armor strength members in the outer layer of armor strength members are at an opposite helix compared to the armor strength members in the inner layer of armor strength members.

32. The cable of any one of paragraphs 16 to 31, wherein the enclosure of the electro-optical package comprises two or more keystones arranged about the optical fiber.

33. The cable paragraph 32, wherein the two or more keystones are formed from a metal.

34. The cable of paragraph 32 or 33, wherein the electro-optical package comprises an outer conductor layer disposed about the two or more keystones.

35. The cable of paragraph 32 or 33, wherein the electro-optical package comprises an outer polymer layer disposed about the two or more keystones.

36. The cable of paragraph 34 or 35, wherein the electro-optical package comprises a layer of metallic or thermoplastic tape disposed about the two or more keystones such that the metallic or thermoplastic tape is located between the two or more keystones and the outer conductor layer or the outer polymer layer, respectively.

37. The cable of paragraph 34 or 35, wherein the electro-optical package comprises a layer of metal wires or strands disposed about the two or more keystones such that the layer of metal wires or strands is located between the two or more keystones and the outer conductor layer or the outer polymer layer, respectively.

38. The cable of paragraph 34 or 35, wherein the electro-optical package comprises a layer of fibers disposed about the two or more keystones such that the layer of fibers is located between the two or more keystones and the outer conductor layer or the outer polymer layer, respectively.

39. The cable of paragraph 38, wherein the fibers comprise glass fibers, ceramic fibers, carbon fibers, or a combination thereof.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A cable comprising:
a plurality of optical fibers forming a fiber bundle that is loosely disposed within an enclosure, wherein the enclosure is formed by a plurality of keystones arranged about the fiber bundle, and wherein a gap between the fiber bundle and an interior of the enclosure, cumulatively, is a cumulative gap that is between 0.004 inches and 0.008 inches;
at least one conductor layer disposed about the enclosure;
a first layer disposed between the plurality of keystones and the at least one conductor layer, the first layer being selected from a group consisting of a layer of metallic or thermoplastic tape, a layer of metal wires or strands, and a layer of fibers;
an insulation layer disposed about the at least one conductor layer;
an inner layer of armor strength members helically disposed about the insulation layer;
an inner jacket disposed between the insulation layer and the inner layer of armor strength members, wherein the inner jacket contacts the insulation layer,
an outer layer of armor strength members helically disposed about the inner layer of armor strength members, wherein the armor strength members in the outer layer of armor strength members are at an opposite helix compared to the armor strength members in the inner layer of armor strength members;
an intermediate jacket disposed between the inner layer of armor strength members and the outer layer of armor strength members that isolates at least a portion of the inner layer of armor strength members from the outer layer of armor strength members; and
an outer jacket disposed about the outer layer, wherein the outer jacket comprises a short-fiber reinforced polymer that is reinforced with strength fibers such that a tensile elongation of the outer jacket is greater than 15%.

2. The cable of claim 1, wherein the outer jacket extends between adjacent armor strength members of the outer layer of armor strength members, and a portion of the outer jacket is positioned between the outer layer of armor strength members and the inner layer of armor strength members to at least partially fill a space between the outer layer of armor strength members and the inner layer of armor strength members.

3. The cable of claim 1, wherein at least one of the armor strength members in the inner layer of armor strength members is at least partially embedded into the inner jacket.

4. The cable of claim 1, wherein the short-fiber reinforced polymer of the outer jacket is reinforced with the strength fibers such that the tensile elongation of the outer jacket is greater than 25% and the outer jacket is configured to bend over an oilfield sheave without cracking the outer jacket.

5. The cable of claim 1, wherein the at least one conductor layer comprises a plurality of conductor layers.

6. The cable of claim 5, wherein each of the plurality of conductor layers is helically disposed about the enclosure.

7. The cable of claim 1, wherein the outer layer of armor strength members covers from about 30% to about 97% of the inner layer of armor strength members, and wherein a coverage of the inner layer of armor strength members by the outer layer of armor strength members allows the outer jacket to flow between the armor strength members in the outer layer of armor strength members and at least partially fill a space between the outer layer of armor strength members and the inner layer of armor strength members.

8. The cable of claim 1, wherein the armor strength members in the outer layer of armor strength members comprise solid armor wire, stranded armor wire, or a combination thereof.

9. The cable of claim 1, wherein the armor strength members in the outer layer of armor strength members comprise stranded armor wire, and wherein the stranded armor wire comprises three or more armor strength members helixed together at a lay angle.

10. The cable of claim 1, wherein the intermediate jacket contacts the outer jacket.

11. The cable of claim 10, wherein the intermediate jacket contacts the inner jacket.

12. The cable of claim 1, wherein the strength fibers have a fiber length, a fiber concentration, or a combination of both, so as to achieve the tensile elongation of the outer jacket of greater than 15%.

13. The cable of claim 1, wherein the intermediate jacket comprises a polymer.

14. The cable of claim 1, wherein the fiber bundle is disposed within the enclosure in a coupled electro-optical package.

* * * * *